United States Patent [19]

Swarts

[11] 4,305,293

[45] Dec. 15, 1981

[54] ANGULAR RATE SENSOR WITH SYMMETRICAL DIAPHRAGM IMPULSE PUMP ASSEMBLY

[75] Inventor: Richard E. Swarts, Simsbury, Conn.

[73] Assignee: United Technologies Corporation, Hartford, Conn.

[21] Appl. No.: 137,110

[22] Filed: Apr. 3, 1980

[51] Int. Cl.³ .............................................. G01P 3/26
[52] U.S. Cl. ................................. 73/505; 73/516 LM
[58] Field of Search ................. 73/516 LM, 515, 505; 417/395, 322; 310/324, 348, 351

[56] References Cited

U.S. PATENT DOCUMENTS 3,361,067  1/1968  Webb .................................. 417/322
3,587,328  6/1971  Schuemann .................... 73/516 LM

*Primary Examiner*—James J. Gill
*Attorney, Agent, or Firm*—Dominic J. Chiantera

[57] ABSTRACT

An angular rate sensor includes an improved impulse pump structure for providing fluid under pressure to a nozzle disposed at one end of a jet chamber to form a constant flow fluid jet, the jet chamber including a pair of temperature sensitive elements disposed at the other end in such a manner as to be differentially cooled by the fluid jet in dependence on the angular rotation of the sensor.

5 Claims, 2 Drawing Figures

ANGULAR RATE SENSOR WITH SYMMETRICAL DIAPHRAGM IMPULSE PUMP ASSEMBLY

DESCRIPTION

TECHNICAL FIELD

This invention relates to angular rate sensors, and more particularly to angular rate sensors of the fluid-jet deflection type having an impulse pump.

BACKGROUND ART

Fluidic angular rate sensors of the jet deflection type are well known in the art. One which has found wide acceptance is the hot-wire anemometer type disclosed in U.S. Pat. Nos. 3,626,765 to Moore et al and 4,020,700, of common assignee herewith, to Lopiccolo et al. In each, balanced bridge temperature sensitive elements disposed at one end of a jet chamber housed within a fluid filled casing, are cooled differentially by a fluid jet in dependence on the Coriolis deflection of the jet during angular rotation of the sensor. In the presence of differential cooling a resultant bridge imbalance produces a differential signal whose magnitude is proportional to the angular velocity of the sensor. The absence of rotation, i.e. the null state, results in equal cooling of the elements and the differential output signal from the bridge is ideally zero.

The sensitivity (volts/degrees/second) and frequency response of the sensor are both dependent on the flow rate of the fluid jet. In both the Moore and Lopiccolo et al sensors the fluid jet is introduced into the jet chamber by a nozzle which receives the fluid under pressure from a jet pump assembly of the type described in U.S. Pat. No. 3,587,328 to Schuemann. This pump assembly includes a diaphragm comprising two piezoelectric material discs coated with a conductive metal film and bonded face to face to a central conductive plate with conductive epoxy. The diaphragm in turn is bonded along the periphery of one disc to one end of a cylindrical, centrally apertured flexible supporting element e.g. flexure, which is clamped at the other end within the sensor casing by a closure plate. The closure plate is epoxy bonded in place within the casing, and forms the end wall of the pump chamber formed by the internal diameter of the cylindrical flexure and the bonded diaphragm.

The piezoelectric discs are polarized to make the electrical axis (X-axis) of the disc perpendicular to the main plane (Y-Z axes), and the discs are mounted to the central plate such that their X-axes are oppositely poled. The diaphragm is electrically connected through the conductive coating into the regenerative loop of an oscillator. The applied AC voltage develops a bending moment on the diaphragm which causes the two discs to expand and contract oppositely on each alternating half cycle of the excitation signal. As a result the diaphragm oscillates, and in each cycle forces fluid from the pump chamber through a pump orifice along the sensor plenum to the jet nozzle, all of which is shown and described by Schuemann.

In the sensor configuration disclosed in Lopiccolo et al the impulse jet pump assembly is essentially identical, with the exception that the pump closure plate, termed an anvil in the '700 patent, is secured within the sensor housing by force of a conical spring held in compression against the anvil with a threaded annular lock nut which is tightened against the spring. This is in contrast to the Schuemann assembly where the closure plate (anvil) is secured within the sensor casing with epoxy. In either case, the anvil or closure plate clamps the support flexure of the pump in place by the force exerted against the support rim of the flexure.

In either pump assembly the diaphragm ideally oscillates at its natural frequency, and the frequency together with the amplitude of displacement determine the cubic feet per minute (CFM) flow rate of the fluid jet in the chamber. The operation of the pump at its natural frequency is obviously desirable, due both to the stability of the frequency of oscillation and to the lower power requirements for maintaining oscillation. The stability of oscillation is most important from the standpoint of maintaining the calibration accuracy, i.e. null offset value, of the sensor. The pump natural frequency value is dependent on a number of factors including the geometry of the diaphragm, the pump chamber, and the pump orifice, and also on the viscosity of the inert gas fluid. The displacement amplitude of the diaphragm (and the amplitude of the fluid pressure pulsations at the output of the pump orifice) is dependent on the damping coefficient of the pump assembly which has a value determined by the aggregate contribution of the various elements of the pump, including the manner in which they are joined to provide the complete assembly.

The largest single contributor in determining both the frequency of oscillation and the displacement amplitude is the diaphragm assembly itself. In the sensor assemblies of Moore et al and Lopiccolo et al, both of which use the basic pump assembly disclosed by Schuemann, the diaphragm is mounted to the flexure along a circumferential band at the periphery of one of the piezoelectric discs. The width of the band is determined essentially by the width of a mounting surface rim on the flexure. This type of mounting results in two distinct disadvantages, or limitations in the Schuemann pump, namely: (1) the maximum mechanical strength of the diaphragm/flexure bond is limited to the peel strength of the metal coating on the piezoelectric disc, and (2) the bond suspends the diaphragm within a plane which is offset from the plane which includes the natural bending point of the diaphragm. While the peel strength of the coating may be sufficient to support the actual mounting of the diaphragm to the flexure, any weakening of the coating may produce a creep or hysteresis in the diaphragm to flexure bond, resulting in a corresponding shift in the damping coefficient and frequency of oscillation. Similarly the mounting of the diaphragm along the surface of the pump chamber side disc produces a nonsymmetry in that it offsets the diaphragm from its natural bending spot, or axis of deformation, which lies in a central plane between the two piezoelectric discs. This produces a nonsymmetry in the radial expansion and contraction of the diaphragm during oscillation, which may result in an offset of the frequency of oscillation from the natural frequency value.

Any offset errors arising out of the diaphragm mounting may be accounted for in the initial calibration of the sensor. In other words they may be calibrated out during manufacture. The major problem caused by the mounting arises over the life of the sensor, i.e. with the long term aging effects. The major attraction of this type of fluidic angular rate sensor lies in the fact that there are no rotating parts, and other than the oscillation of the diaphragm, there are no other moving parts within the sensor. As such the sensor has utility in long storage, or long shelf life applications, which require that the sensor maintain calibration accuracy for long time intervals. Some as long as ten years. The aging and hysteresis effects on the actual bond strength, and the unpredictability of the diaphragm oscillation due to the non-symmetric mounting, tend to reduce the sensor ability to maintain long term calibration accuracy.

Another problem associated with long storage life applications is the possibility of degree of depolarization of the piezoelectric diaphragm during storage. This, when the sensor is later actuated, reduces the displacement amplitude of the diaphragm during oscillation which in turn affects the amplitude of the pressure pulsations and the CFM flow rate of the fluid jet. It would be desirable to repolarize the piezoelectric wafers of the diaphragm prior to sensor actuation following the storage time interval, in a manner similar to the automatic recalibration routine provided for in U.S. Pat. No. 4,026,159 to Isakson et al where the sensor bridge is automatically renulled immediately prior to actuation of the pump assembly. The prior art assemblies do not have the ability to provide such a repolarization due to electrical inaccessibility to the internal surfaces of the piezoelectric discs.

DISCLOSURE OF INVENTION

One object of the present invention is to provide an angular rate sensor with an impulse pump having a symmetrically mounted diaphragm. Another object of the present invention is to provide an angular rate sensor having an impulse pump comprising two oppositely poled piezoelectric wafers which may be repolarized in situ within the sealed casing.

According to the present invention, an angular rate sensor includes a sealed, fluid filled casing for housing a jet chamber, and for housing an impulse pump connected for response to an external source of AC signals and supported in registration with the jet chamber by an anvil support means, the jet chamber including temperature sensitive elements disposed at one end which are differentially cooled by a fluid jet in dependence on the angular rotation of the sensor, the jet being formed by a nozzle disposed at another end from fluid forced under pressure through the nozzle by the pump, the pump having an integral diaphragm flexure assembly which includes a diaphragm formed directly on the major surfaces of an end wall of a hollow cylindrical flexure element, the other end of which has an aperture with a major diameter equal to that of the element so as to form a cavity internal of the flexure, the end wall including a minor diameter aperture and the diaphragm including a pair of conductive film coated piezoelectric wafers having like positioned minor diameter apertures and metallurgically bonded in face to face relation to each side of the end wall with registration of the minor diameter apertures in the wafers and the end wall, the integral diaphragm flexure assembly being adapted to engage the anvil support means which closes the end of the cavity to form a pump chamber. In further accord with the present invention the cylindrical flexure element is in electrical contact with the sensor casing through engagement of the flexure with the anvil support means, providing an electrically conductive path for external electrical signals to the bonded surfaces of each of the piezoelectric wafers, the other sides of which are connected through the casing for response to an external source of signals, whereby each wafer may be electrically isolated with the sealed casing to provide for repolarization of the wafers in the casing by an external source of polarization signals.

The angular rate sensor of the present invention provides for improved sensor accuracy and long term calibration through the use of an impulse pump having a symmetrical mounted diaphragm. The diaphragm piezoelectric wafers may be repolarized within the sealed casing following a long term storage interval to ensure pump operation. The mounting of the diaphragm integral with the flexure provides the optimum bending moment location for the diaphragm, thereby allowing for a more stable frequency of oscillation and displacement amplitude. These and other objects, features and advantages of the present invention will become more apparent in light of the description of a best mode embodiment thereof, as illustrated in the accompanying drawing.

BEST MODE FOR CARRYING OUT THE INVENTION

Figure 2:
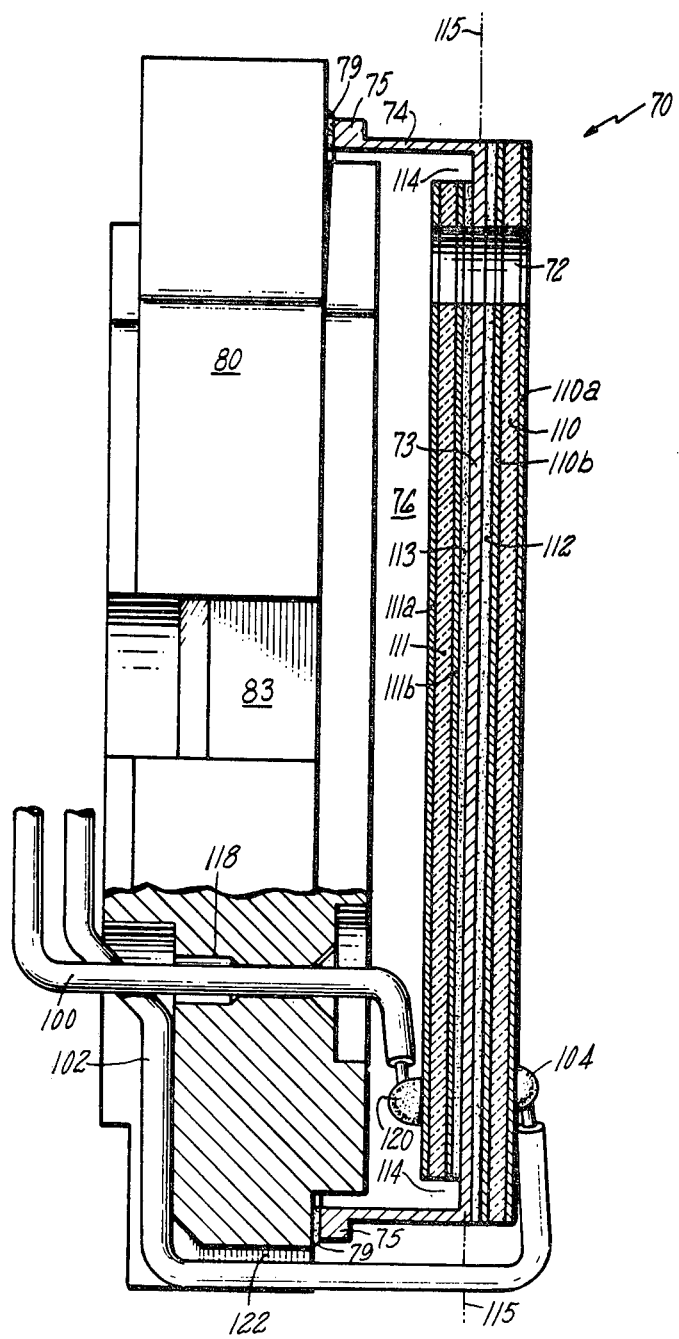
FIG. 2 is a partially sectioned, partially broken away side elevation view of the symmetrical diaphragm impulse pump assembly used in the sensor of FIG. 1.

The present fluid-jet angular rate sensor illustrated in FIG. 2 is identical, except for the improved impulse pump structure, to that disclosed in FIG. 2 of the hereinbefore referenced U.S. Patent to Lopiccolo et al. Only a simplified description of the sensor elements and operation is provided herein, as necessary for an understanding of the present invention, and common reference numerals are used where applicable to describe common elements in each.

As shown in FIG. 2, the sensor (not illustrated in scale) includes a thin-walled cylindrical casing 10 having an access end 11 and closed end 12. The access end 11 includes internal threads 15 for receiving a lock nut that secures the sensor internal components within the casing. The casing includes weld lips 17, 18 at each end. An end cover 16 is bead welded 19 to the lip 17 at the closed end to provide a hermetic seal with the casing and a similar bead weld 19 at the access end hermetically seals a header to the casing. The casing and other major components are of non-magnetic, anti-corrosive material, such as 300 Series Stainless Steel.

Internally, the sensor includes a cylindrical shape nozzle block 20 having two overall diameters associated with two different internal diameters of the casing resulting from the shoulder 13. The nozzle block 20 has a major annular groove 23 which with the case 10 forms a fluid manifold chamber 24 for receiving fluid under pressure from a feed port 25 formed in the wall of the groove 23. The nozzle block also includes: fluid feed tubes 26 which conduct the pressurized fluid from the feed manifold chamber to an inlet manifold chamber 27 formed between the nozzle block and the end cover 16, and a nozzle 28 disposed in the end wall of the nozzle block to provide a fluid conduit from the manifold chamber 27 into a jet chamber 29 formed as a major axial bore within the block. The nozzle block also has a pump mounting flange 37 including an internal counter bore 38, a wire feed through hole 39, and a plurality of mill slots (such as the slot 40) which may be used either for wire passageways or as a key for aligning the nozzle block within the casing.

The nozzle block further includes a counter bore 45 for seating a sensor plug assembly 50 in alignment with the nozzle in the jet chamber 29. The plug assembly includes exhaust ports 51 to permit the fluid flow through the plug into an exhaust chamber 52 formed in the pump mounting flange 37. The sensing elements, which are preferably tungsten wires 53, 54, are mounted to associated pairs of Kovar ® metal alloy posts (56, 57 for the element 53). The posts are secured in the plug through glass insulators 60 and the sensor elements are connected through insulated wires 61 (and posts 62) which may be routed through the milled slot 40 to the access end of the casing.

Figure 1:
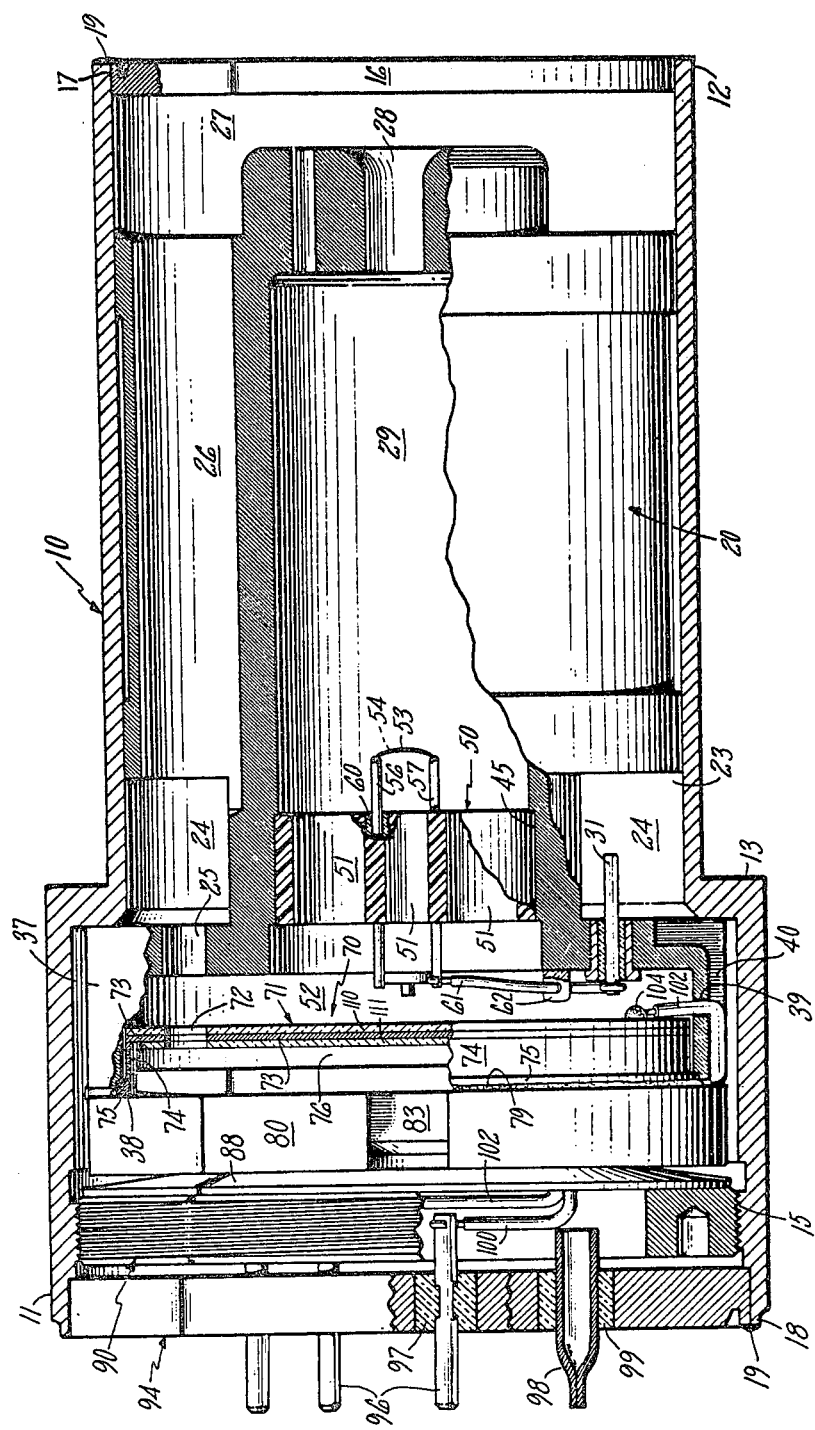
FIG. 1 is a partially sectioned, partially broken away side elevation illustrative view of the fluidic angular rate sensor of the present invention.

The impulse pump assembly 70, described in detail with respect to FIG. 1, includes a piezoelectric diaphragm 71 with a pump orifice 72 bored through the diaphragm; the pump orifice being located off center so as to be in registration with the feed port 25 of the nozzle block. The diaphragm is integrated with (into) an end wall 73 of a hollow, cylindrical structure, or flexure 74. As described in more detail in FIG. 1, the end wall provides mid-plane support for the diaphragm, i.e. between the two piezoelectric discs, which are bonded on either side of the face wall. The opposite end of the flexure, the open end, includes an outwardly directed support rim 75 which seats in the counter bore 38 of the nozzle block. In operation, the application of AC voltage to the piezoelectric diaphragm causes it to oscillate, producing fluid pressure pulsations in the pump chamber 76 formed internally of the flexure 74. These pulsations force fluid under pressure through the pump orifice 72, creating a fluid pressure concentration in the exhaust chamber 52. The exhaust chamber in turn forces the fluid through the feed port 25, the manifold 24, and the feed tubes 26 to the inlet manifold chamber 27 which supplies the nozzle 28. The flow rate of the fluid in cubic feet per minute (CFM) is dependent on the geometry of the pump chamber, the pump diaphragm, and the frequency of oscillation of the pump. The fluid velocity $V_p$ within the jet chamber is established by the cross sectional area (A) of the nozzle, or $V_p = CFM/A$.

In the present pump assembly, the flexure 74 may be mounted within the casing 10 by either of the mounting methods used in the Moore et al or Lopiccolo et al sensor assemblies, namely through the epoxy bond of the support rim to the face of the closure plate as in Moore et al, or by virtue of the applied force exerted by the anvil 80 as provided for in Lopiccolo et al. Alternatively the flexure may be metallurgically bonded along the support rim to the face of the anvil, as disclosed in a commonly owned, copending application entitled FLUIDIC ANGULAR RATE SENSOR WITH INTEGRATED IMPULSE JET PUMP ASSEMBLY, Ser. No. 137,109 filed on even date herewith by E. M. Moffatt. As disclosed bu Moffatt the metallurgical bond may include any one of a number of known metallurgical bonding processes, such as a lead-tin solder bond, or weld. The mating surface wall of the anvil seals the opening of the flexure cavity to provide the pump chamber 76. The anvil also includes internal feed through holes (FIG. 1) and milled wire clearance slots (83) which are complementary of the milled slots (40) in the nozzle block to facilitate electrical connection to the diaphragm. The internal diaphragm flexure assembly is seated in the nozzle block by the force applied to the rear surface of the anvil by a conical spring 88 which is under pressure from an annular lock nut 90 threaded into the internal threads 15 of the casing.

The header 94 welded to the access end of the casing includes feed through terminals 96 disposed in glass insulators 97 through the header, to permit electrical connection to the pump 70, the sensing elements 53, 54, and a pair of bridge balance resistors included in the casing (as disclosed by Lopiccolo et al). The connections to the pump are provided through wires 100, 102 soldered (104) to either side of the piezoelectric diaphragm. The header also includes a fill tube 98 disposed in a fused glass sleeve 99 to permit filling the sensor with the fluid medium, i.e. an inert gas, such as helium.

Referring now to FIG. 1, the diaphragm 71 includes two polarized piezoelectric wafers 110, 111, each coated on both major surfaces with a conductive metal film $110_a$, $110_b$ and $111_a$, $111_b$. The coating may comprise silver, nickel, or any other suitable electrically conductive metal. The wafers are bonded with metallurgical bonds 112, 113 in face to face registration on either side, i.e. the outside and inside surfaces, of the flexure end wall 73. The metallurgical bonds are preferably lead-tin solder bonds, however, any known metallurgical bonding technique such as diffusion or ultrasonic bonding may be used. The bonding provides electrical continuity between the wafer coatings ($110_b$, $111_b$) and the end wall 73.

The metallurgical bond process is temperature limited by the depolarization temperature value of the piezoelectric wafers. As stated hereinbefore, the wafers are polarized along the X-axis perpendicular to the main plane (Y-Z) of the diaphragm to provide a radially symmetric expansion and contraction of the diaphragm when excited by the AC voltage signal from the external oscillator. For piezoelectric material of lead-zirconium-titanate the depolarization temperature is in the range of from 550° to 600° F. (288° to 316° C.). The lead-tin solder melting point is less than half the depolarization temperature value for this material, such that there is no depolarization or degradation in polarization. The other types of metallurgical bonds must take into account the particular piezoelectric material depolarization temperature limits.

As shown in FIG. 1 the wafer 111 which is bonded to the inside surface of the flexure wall 73, i.e. inside the pump chamber 76, is of a smaller diameter than the outside wafer 110. This allows for free flexing, or displacement of the diaphragm without obstruction by the inside walls of the flexure. As a result, an annular groove 114 is formed along the inside surface of the end wall. The width of the groove is equal to the difference diameters between the wafer 111 and the internal surface of the wall. The inside wafer diameter being selected so as to allow free movement of the diaphragm.

The metallurgical bonds 112, 113 provide a consistent, full strength bond along the entire surface areas of both wafers 110, 111. The monolithic-like relation of the end wall 73 with the supporting wall of the flexure permits formation of a superior bond between flexure and diaphragm.

The actual bond strength is still limited to the peel strength of the coatings $110_b$, $111_b$, however, the fact that the bonds are formed along the entire mating surface area of the coated piezoelectric wafers absolutely minimizes any hysteresis due to the degradation, loosening, or creep of the bond. The mounting of the diaphragm along its central plane 115 (shown in phantom) provides a diaphragm with an essentially balanced weight distribution, thereby allowing for the symmetrical deformation, or bending of the diaphragm. This further provides for a more stable damping coefficient for the pump resulting in a more consistent fluid flow rate. The flexure material is preferably an iron-nickel alloy, such as an Invar ® alloy, with an essentially zero temperature coefficient of expansion. This allows for greater compatibility with the temperature coefficients of the piezoelectric wafers, thereby minimizing induced stress into the main plane (radial stress) of the diaphragm.

As described hereinbefore the integrated diaphragm/flexure assembly may be seated internally within the casing in the same manner described in the Lopiccolo et al patent, namely through the use of the compression fitting of anvil 80 and spring 88. Alternatively, the preferred way would be the metallurgical bond (79) of the integrated unit to the anvil. This type of bond, as described in the hereinbefore referenced copending application to Moffatt, eliminates the sensitivity of the flexure to external stressing of the casing 10, which can cause a shift in the frequency of oscillation of the diaphragm and, in the worst case, actually stop pump oscillation.

The pump diaphragm 71 receives the AC electrical signal from the diaphragm oscillator (similar to that disclosed in Schuemann or Lopiccolo et al) through the wires 100, 102 which are routed through separate apertures in the anvil. The wire 100 is routed through an aperture 118 into the pump chamber 76 and connected through an electrical solder 120 to the surface 111$_b$ of the chamber side wafer 111. The wire 102 is routed through a slot 122 in the anvil and slot 40 and hole 39 in the pump mounting flange 37, and is connected through a solder connection 104 to the surface 110$_a$ of the top piezoelectric wafer 110. The location of the feed through apertures and slots 118, 122 in the anvil are identical to those described in the Lopiccolo et al patent, and allow electrical connection to the diaphragm, so as to provide a minimum amount of damping to the diaphragm.

In either type mounting of the integrated unit the flexure 74 is in contact with the anvil which in turn is in contact with the casing. This provides electrical continuity between the external surface of the casing and the end wall 73, which is in the central plane of the diaphragm. This together with the electrical connections 100, 102 of the piezoelectric wafers 110, 111 permits the electrical isolation of each wafer with the pump installed within the hermetically sealed casing. As such the diaphragm may be repolarized by an external source connected to the casing and, in turn, to the header pins 96 associated with the lines 100, 102. This may be done at any time without violating, or disassembling the sensor, or without disturbing the mounting of the sensor in its parent apparatus. This permits the repolarization immediately prior to actuation of the sensor following an interim life storage period, thereby further ensuring the sensor performance.

The present impulse pump with the integral flexure/- diaphragm assembly may be used as a direct replacement for the existing pump assemblies. The geometry, i.e. diaphragm diameters, length and outside diameter of the flexure, and the anvil 80 may be made identical to those of the existing pump. This allows the remaining sensor assembly, including the locating keys for aligning the pump to provide registration of the pump orifice 72 with the fluid feed port (15, FIG. 2) of the nozzle block, to be identical to those described of the assembly of the pump into the sensor are here omitted.

Similarly, although the invention has been shown and described with respect to a preferred embodiment thereof, it should be understood by those skilled in the art that various changes, omissions and additions may be made therein and thereto without departing from the spirit and scope of the invention.

I claim:
1. An angular rate sensor, including:
   a sealed, fluid filled casing for housing a nozzle block assembly having a jet chamber disposed therein, and for housing a jet pump assembly connected for response to an external source of AC signals and supported in registration with said jet chamber by an anvil support means adapted to engage said casing internally, said jet chamber including a nozzle and sensing elements disposed at opposite ends thereof, said sensing elements being cooled differentially in dependence on the angular rotation of the sensor, by a fluid jet formed by fluid force under pressure through said nozzle by an improved pump assembly, comprising
   a diaphragm flexure assembly including a cylindrical flexure element having a mounting end with a major diameter aperature adapted to engage said anvil support means and having another end thereof closed to a minor diameter aperture by an end wall to form a pump chamber therein, said diaphragm flexure assembly further including a pair of piezoelectric material wafers coated on each side with an electrically conductive film and metallurgically bonded face to face on either side of said end wall to form a pump diaphragm, said wafers having like positioned minor diameter apertures in registration with said minor diameter aperture in said end wall to form a pump orifice in fluid communication with said nozzle, said wafers connected at the other side of each for response to the external source of AC signals for providing oscillatory displacement of said diaphragm to force fluid from said chamber through said orifice to said nozzle.

2. The angular rate sensor of claim 1, wherein said piezoelectric wafers are metallurgically bonded to said end wall with lead-tin solder.

3. The angular rate sensor of claim 1, wherein:
   said piezoelectric wafers are each polarized along a common, electrical axis perpendicular to said wafer main surfaces; and wherein
   said piezoelectric wafers are bonded to said end wall along similarly polarized major surfaces of each, whereby the electrical axes of each wafer of said pair are oppositely poled in the diaphragm assembly.

4. The angular rate sensor of claim 3, wherein said engagement of said diaphragm flexure assembly with said anvil in combination with said engagement of said anvil with said casing, provides an electrically conductive path from said casing to said end wall, said electrically conductive path in combination with said connections of said other sides of said wafers to the external source of AC signals providing electrical connections external of said casing to each of said wafers sealed therein, whereby said external electrical connections may be adapted to provide polarization signals to each of said wafers while sealed within said casing.

5. The angular rate sensor of claim 3, wherein:

said piezoelectric wafers are each polarized along a common, electrical axis perpendicular to said wafer main surfaces; and wherein said bonded piezoelectric wafers are oriented with respect to their direction of polarization so as to provide for an opposite strain to be induced in each wafer in response to the external source AC signal presented thereto, said oppositely induced strain in each wafer providing for a periodic bending of said diaphragm at a frequency equal to that of the applied AC signal.

* * * * *

UNITED STATES PATENT AND TRADEMARK OFFICE
CERTIFICATE OF CORRECTION

PATENT NO. : 4,305,293
DATED : December 15, 1981
INVENTOR(S) : Richard E. Swarts It is certified that error appears in the above—identified patent and that said Letters Patent is hereby corrected as shown below:

Column 3, line 68 "with" should be --within--.

Column 5, line 57 "bu" should be --by--.

Column 5, line 66 "internal" should be --integral--.

Column 7, line 48 "of" should be --to--.

Column 8, line 1 after "described" insert --by Lopiccolo et al.

For this reason the details--.

Signed and Sealed this

Third Day of August 1982

[SEAL]

Attest:

Attesting Officer

GERALD J. MOSSINGHOFF

Commissioner of Patents and Trademarks